INVENTOR.
Clifford C. Wrigley
BY
HIS ATTORNEY

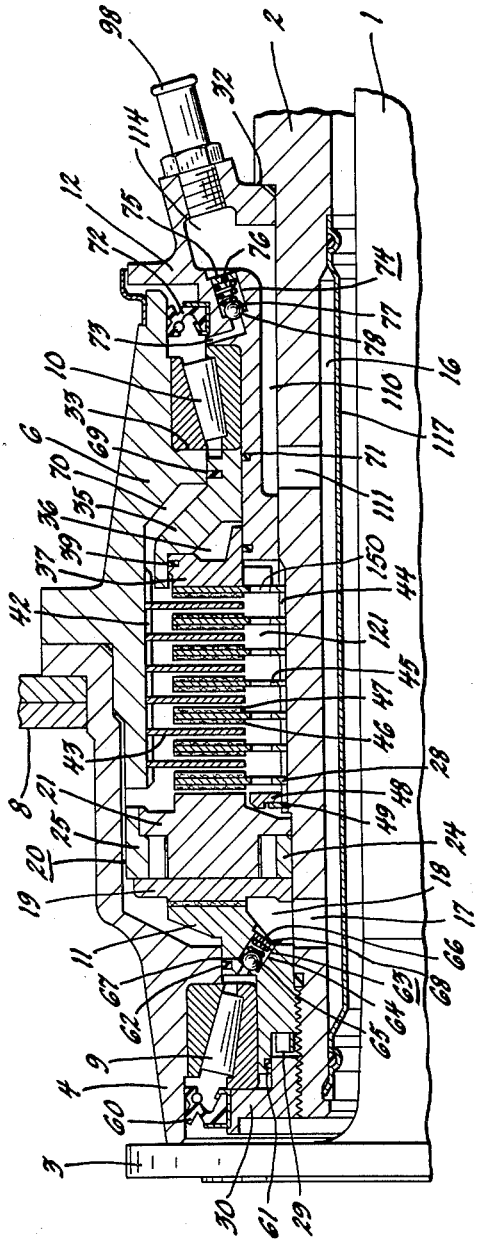

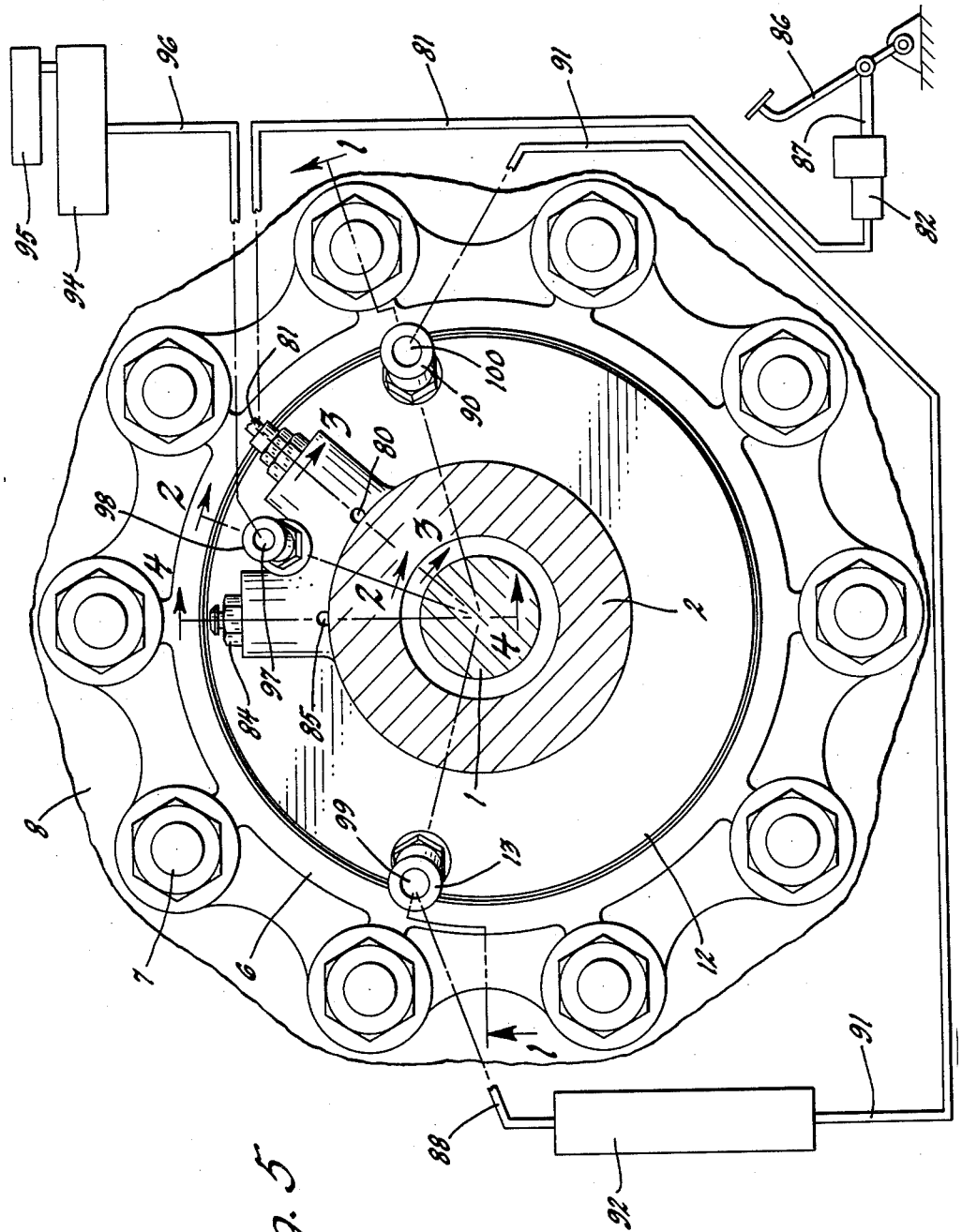

Jan. 1, 1963     C. C. WRIGLEY     3,071,211
BRAKE COOLING FLUID SYSTEMS
Filed April 6, 1960     5 Sheets-Sheet 4

INVENTOR.
Clifford C. Wrigley
BY
HIS ATTORNEY

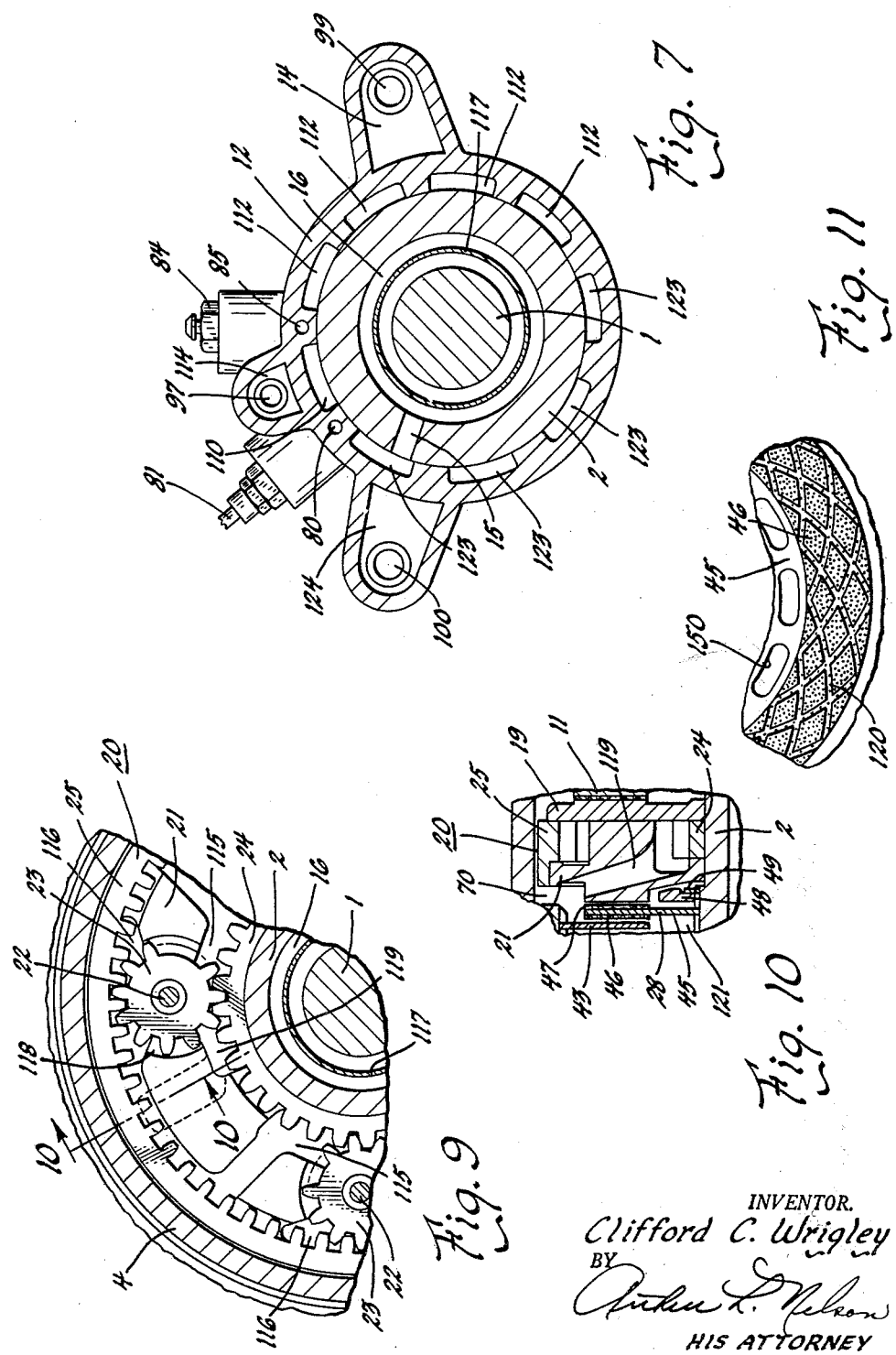

United States Patent Office 3,071,211
Patented Jan. 1, 1963

3,071,211
BRAKE COOLING FLUID SYSTEMS
Clifford C. Wrigley, Grosse Pointe Woods, Mich., assignor to General Motors Corporation, Detroit, Mich., a corporation of Delaware
Filed Apr. 6, 1960, Ser. No. 20,299
5 Claims. (Cl. 188—18)

This invention relates to a vehicle brake and more particularly to a fluid system having means for providing a large volume of low pressure fluid at the input side of the fluid pressurizing means in a cooling fluid system.

Vehicle brakes employing a cooling fluid system usually have forced circulation of the cooling fluid. The means for providing the circulation of the fluid creates a pressure on the output side of the pressurizing means. This, in turn, creates a decrease in pressure on the input side of the circulating means. The decrease on the input side of this type of a system may be so great that it causes a partial vacuum. This could, in part, be due to the fact that an input conduit is too small as well as the system fails to have the proper construction to accommodate the circulation of the fluid through the system.

The creating of a vacuum on the input side of the pump creates inefficiency and if an inadequate seal arrangement is provided around the bearing assembly, air may be drawn into the system.

Accordingly, this invention is intended to overcome this disadvantage. The cooling fluid system employs conduit and passage means providing continuing circulation of the fluid through a heat exchanger to provide cooling of the vehicle brakes. A reservoir is also in communication with the system having a large conduit means leading to the input side of the pressurizing means. This provides an adequate supply of cooling fluid at substantially reservoir pressure at the inlet port of the pumping means. This increases the efficiency of the cooling system and also prevents entrance of air into the system when a sudden surge is created by the acceleration of the cooling fluid pump.

It is an object of this invention to provide a brake cooling system wherein a large volume of fluid at reservoir pressure is available at the inlet port of the fluid circulating means.

It is another object of this invention to provide a brake cooling system operating as a closed fluid system with forced circulation of the cooling fluid and having a minimum pressure fluid line feeding from the reservoir into the system at the inlet of the source of pressurized fluid.

It is a further object of this invention to prevent the low pressure or partial vacuum on the input side of the fluid cooling pump from existing long enough to draw air into the system due to the surge in initial operation of the fluid cooling pump.

It is a further object of this invention to provide in a brake cooling system a fluid cooling pump having continuous circulation of cooling fluid in a system which operates as a closed system with the addition of a controlled pressure fluid line feeding to the input side of the fluid cooling pump thereby providing adequate volume for the cooling fluid system.

The objects of this invention are accomplished by providing a fluid disk brake having cooling passage means in said brake and an external conduit means having means for cooling the fluid external of the braking structure. The vehicle brake contains a cooling fluid pump which operates in response to the degree of actuation of the vehicle brakes. The cooling system operates as a closed system wherein the fluid is forced through the external cooling means and the brake by means of a pump. In combination with this system is provided a reservoir mounted external of the vehicle brakes having a large conduit means leading into the brakes and entering the system at a point adjacent the input of said cooling fluid pump. In this manner, the fluid circulating through the system is relatively constant but an adequate supply of fluid is present at a reservoir pressure on the input side of the pump to provide for variations of volume required in circulation when the cooling fluid pump is operated by the actuation of the vehicle brakes. The reservoir external of the brakes is provided for an expansion means which allows for variation in the volume of the fluid within the system.

The gearing assemblies for the vehicle wheel are mounted at a point adjacent to the low pressure side of the cooling fluid system. A check valve is provided to relieve excessive pressure within the bearing assemblies and also to prevent a momentary surge of vacuum from drawing air into the bearing assembly and the cooling fluid system.

A system of this type provides for efficiency of operation due to the fact that it is not possible to draw a continuous vacuum on the low pressure side of the pumping means. It also provides a means for forcing the circulating fluid back to the input side of the pump by circulating the fluid directly through the heat exchanger and then returning it under pressure to the low side of the fluid pump. The fluid is not pumped through the reservoir but the reservoir only provides a means for expansion of fluid in the system and is connected to the input side of the pump to provide adequate supply of fluid at reservoir pressure at this point.

Further objects and advantages of the present invention will be apparent from the following description, reference being had to the accompanying drawing wherein preferred embodiments of the invention are clearly shown.

In the drawings:

FIGURE 2 is a cross-section view taken on line 2—2 of FIGURE 5. This view shows the check valves operating in conjunction with the bearing assemblies.

FIGURE 3 is a cross-section view taken on line 3—3 of FIGURE 5 and showing the actuating means of the brake.

FIGURE 4 is a cross-section view taken on line 4—4 of FIGURE 5 and showing the bleeder arrangement of the vehicle brake.

FIGURE 5 is an end view of the braking structure showing the location of the cross sections, for the various views as well as the fluid systems.

FIGURE 7 is a cross-section view taken on line 7—7 of FIGURE 1.

FIGURE 9 is a cross-section view taken on line 9—9 of FIGURE 1.

FIGURE 10 is a fragmentary section taken on line 10—10 of FIGURE 9.

FIGURE 11 is a fragmentary section taken on line 11—11 of FIGURE 1.

FIGURE 1 is a cross-section view showing the broad combination of the vehicle wheel and braking structure and the related parts of the cooling fluid pump and the bearing assembly for supporting the brake housing. The wheel is centrally supported over the braking structure between the inboard and the outboard bearing assemblies.

Figure 1:
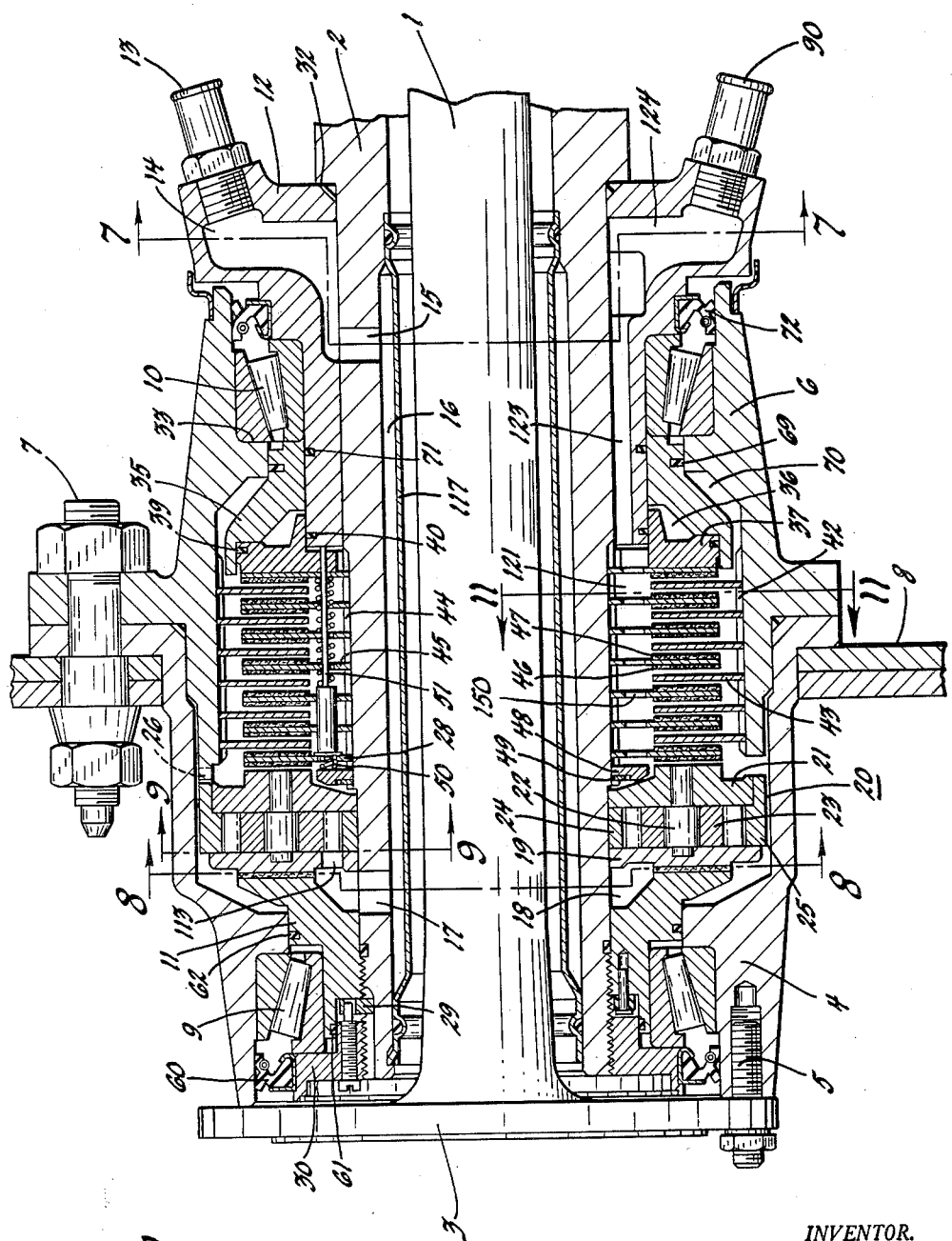
FIGURE 1 is a cross-section view of the braking structure taken on line 1—1 of FIGURE 5 and disclosing the cooling fluid pump and the bearing assemblies.
Figure 6:
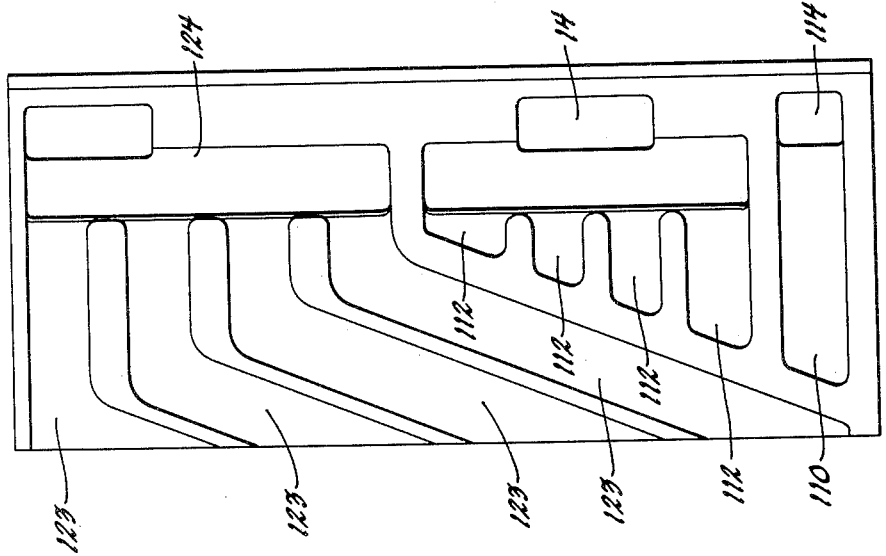
FIGURE 6 is a development of the passage means within the inner periphery of the oil delivery sleeve.

The drive shaft 1 extends centrally through the shaft housing 2 to form a radial flange 3 which is fastened to the outer brake housing 4 by means of a plurality of bolts 5. The outer brake housing 4 extends axially inward over the inner brake housing 6. The inner brake housing 6 and the outer brake housing 4 are fastened together by means of a plurality of wheel bolts 7 which retain the wheel 8 in a position on the outer periphery of the housing. The wheel 8 is centrally supported over the outboard bearing assembly 9 and the inboard bearing assembly 10. The outboard bearing assembly is mounted on the outer periphery of the reaction plate 11. The inboard bearing assembly 10 is mounted on the outer periphery of the oil delivery sleeve 12. In this manner, the drive shaft 1 rotates with the brake housing and the vehicle wheels 8 as a unit.

The oil delivery sleeve 12 is provided with an inlet fixture 13 on its inboard end which feeds into the passage 14. The passage 14 extends inward to the passages 15. The passages 15 are in communication with the peripheral passage 16 which is formed by the outer periphery of the sleeve 117 which is sealed at both ends and forms a passage with the inner periphery of the shaft housing 2. The peripheral passage 16 extends axially outboard to the radial passages 17 in the shaft housing 2. The passages 17 extend radially outward to communicate with a chamber 18 formed by the reaction plate 11 and the cover plate 19 of the cooling fluid pump 20.

The cooling fluid pump comprises a pump housing 21 and a cover plate 19 which are fastened in a nonrotative relationship by means of a plurality of planetary gear supporting pins 22. The planetary gears 23 rotate within a pump housing 21 and engage the sun gear 24 which is rotatably mounted on the shaft housing 2. The planetary gears 23 also engage the ring gear 25 forming the outer periphery of the cooling fluid pump 20. The cooling fluid pump 20 is connected to the inner brake housing 6 by means of a spline 26. In this manner, the ring gear and the pump assembly rotate with the brake housing when the vehicle wheel is rotated. The frictional engagement of the stator disk 28 and the reaction plate 11 on the pump housing 21 and the cover plate 19 respectively cause a retardation of the pump housing relative to the ring gear and a pumping action as the planetary gears 23 engage the ring gear 25 and the sun gear 24.

The reaction plate 11 is maintained in its axial position as it threadedly engages the outer periphery of the outboard end of the shaft housing 2. The reaction plate 11 abuts the locking plate 29 and is locked in position by a pin. The bearing adjusting annular nut 30 also threadedly engages the outboard end of the shaft housing 2 and provides a bearing adjustment for the outboard bearing assembly 9 and the inboard bearing assembly 10.

The inboard bearing assembly 10 is mounted on the outer periphery of the oil delivery sleeve 12 and inner periphery of the inboard end of the inner brake housing 6. The inboard end of the oil delivery sleeve 12 abuts a shoulder 32 on the outer periphery of the shaft housing 2. The outboard end of the bearing assembly 10 abuts the shoulder 33 on the inner periphery of the inner brake housing 6.

The wheel cylinder 35 is also mounted on the outer periphery of the oil delivery sleeve 12. The annular hydraulic wheel cylinder 35 forms a pressurizing chamber 36 with the annular hydraulic piston 37. The piston 37 and the cylinder 35 are provided with the seals 39 and 40 to maintain a fluid tight pressurizing chamber 36.

The vehicle brake comprises the inner brake housing 6 which is formed with a spline portion 42 on its inner periphery to accommodate a plurality of rotating disks 43. The shaft housing 2 is also provided with a spline portion 44 for accommodating the stationary disks 45. The stationary disks 45 have frictional material 46 and 47 bonded to their lateral surfaces for engagement with the rotating disks 43. The outboard end of the spline portion 44 of the shaft housing 2 receives an annulus 48 which is locked in position by means of a snap ring 49.

In this manner, the stator disks are maintained in their position on the shaft housing 2.

A retraction means is provided on the inner portion of the brake which includes the retraction spring 50 operating against the sleeve 51 which engages the annular hydraulic wheel piston 37. The retraction means also includes an automatic adjusting means including the sleeve 51.

FIGURE 5 discloses an end view of the braking structure and the position of the cross sections cut through the various portions of the brake.

FIGURE 2 is a cross-section view shown on line 2—2 of FIGURE 5. This view discloses the seal check valves for relieving pressure on the bearings as well as preventing suction through the external seals.

The outer brake housing 4 is rotatably mounted on the outboard bearing assembly 9 and the inner brake housing 6 is rotatably mounted on the inboard bearing assembly 10. The outboard bearing assembly 9 is provided with an external seal 60 which seals the outboard side of the outboard bearing assembly 9 from the atmosphere. The bearing adjusting nut 30 is also sealed on its outer periphery and on the inner periphery of the reaction plate 11 by means of the seal 61. The inboard end of the outboard bearing assembly 9 is sealed by a seal 62 and also is vented and sealed by the check valve assembly 63. The check valve assembly 63 is mounted within the chamber 64 and includes a ball 65 biased to a contacting position on a valve seat 67 by the coil spring 66. The coil spring 66 is seated upon a snap ring 68. The chamber 18 on the outlet side of the check valve assembly 63 is in communication with the inlet port 113 on the cooling fluid pump.

The inboard bearing assembly 10 is rotatably mounted within the inner brake housing 6. The bearing assembly 10 is also mounted on the outer periphery of the oil delivery sleeve 12. The seal 69 seals the outboard side of the bearing assembly 10 from the high pressure chamber 70. The outboard end of the bearing assembly 10 is also sealed by the seal 71 which seals the bearing 10 from the pressurizing chamber 36 within the hydraulic wheel cylinder 35. The inboard end of the bearing assembly 10 is sealed by the seal assembly 72 which seals the bearing chamber from the atmosphere. The bearing chamber for the bearing assembly 10 is in the passage 73 which is connected with the passage 114. A check valve assembly 74 is mounted within the passage 73 and includes a snap ring 75 and a spring 76 biasing the ball 77 to seat against the valve seat 78. This check valve assembly 74 seals the bearing chamber 10 from the passage 114.

The vehicle brakes are actuated by means of the hydraulic wheel piston 37 operating within the hydraulic wheel cylinder 35. This is more clearly shown in FIGURE 3 which is a cross section taken through the inlet passage means 80 which is in communication with the conduit 81 which leads to the hydraulic master cylinder. The fluid is pressurized within the master cylinder 82 and conduit means 81. This, in turn, pressurizes the fluid within the chamber 36 which actuates the vehicle brakes.

FIGURE 4 is a cross-section view showing the means for bleeding the vehicle brakes. The fluid is pressurized within the pressurizing chamber 36 and within the passage 83. When the plug 84 is removed from the passage 85 the pressurized fluid in the chamber 36 forces fluid outwardly through the passage 85. The fluid is forced through the passage 85 until all air is removed from the vehicle brakes.

FIGURE 5 shows the end view of the vehicle brake and the various connections for the fluid conduits leading into the brake. The conduit 81 leads to the master cylinder 82. The brake pedal 86 pressurizes fluid within the master cylinder 82 by means of the push rod 87.

The cooling fluid system is provided with an inlet port 99 through the fixture 13 which is connected to the conduit 83. The outlet port 100 is formed in the fixture 90 which is connected to the conduit means 91. The heat exchanger 92 is placed between the conduits 88 and 91. In this manner, the cooling fluid system provides for circulation of the fluid which passes through the cooling fluid motor through the external cooling fluid system and the heat exchanger 92 and then returns to the inlet side of the cooling fluid pump 20. An additional feature is shown in this view which is one of the main features of the invention. The fluid system includes a reservoir 94 which is provided with an expansion chamber 95. The reservoir 94 is also connected to the conduit 96 which connects to the zero line port 97 through fitting 98, and to the peripheral sleeve passage 16 to provide an adequate supply of low pressure fluid to prevent suction and evacuation at the inlet port of the cooling fluid pump 20. The passage means for connecting the reservoir 94 through the brakes is shown in the subsequently described figures.

FIGURE 7 is a cross-section view taken on line 7—7 of FIGURE 1. This view shows the inlet port 99 and the outlet port 100 as well as the zero line port 97. This view also shows the conduit 81 which leads to the hydraulic master cylinder 82 as well as the hydraulic wheel cylinder 35. This view shows the passage 85 leading to the bleeder plug 84 from the wheel cylinder 35. The view shows the longitudinally extending passages angularly spaced about the inner periphery of the oil delivery sleeve. The zero line passage 114 is in communication with the axial passage 110 which feeds into the radial passage 111. The radial passage 111 in the shaft housing 2 is in communication with the peripheral passage 16 about the outer periphery of the sleeve 117 which is mounted within the inner periphery of the shaft housing 2.

The inlet passage 14 is in communication with the inlet port 99. The passage 14 is in communication with a plurality of axially extending passages 112 which are in communication with a plurality of radial passages 15. These passages place the passage 14 in communication with peripheral passage 16 which extend longitudinally within the inner periphery of the shaft housing 2.

Figure 8:
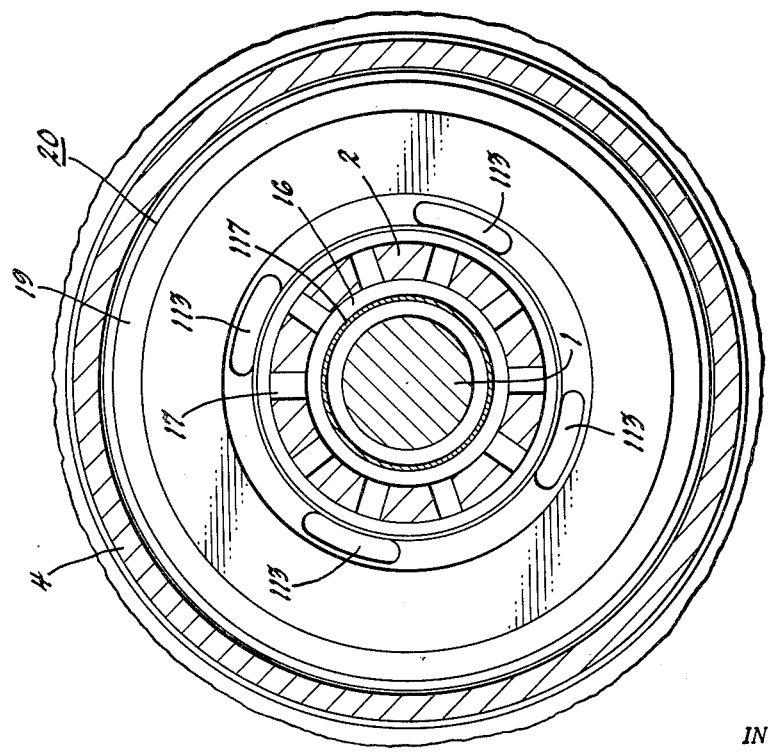
FIGURE 8 is a cross-section view taken on line 8—8 of FIGURE 1.

The outboard end of the peripheral passage 16 is in communication with the chamber 18 through the radial passages 17. FIGURE 8 is a cross-section view drawn through the passage 18 and the peripheral passage 16 which shows the connection of the inlet port 113 feeding through the cover plate 19 to the inlet side of the cooling fluid pump 20. The cover plate 19 is shown mounted within the outer brake housing 4. Mounted within the inner periphery of the shaft housing 2 is also shown the sleeve 117.

The pump assembly 20 is also shown in FIGURE 9 which is a cross-section view taken between the cover plate 19 and the planetary gears 23. Referring from FIGURE 8 to FIGURE 9, its readily seen that the oil delivered through the plurality of inlet ports 113 is delivered to the passage 115 at the point where the planetary gears 23 are unmeshing with the sun gear 24. The fluid is carried about the outer periphery of the planetary gear 23 and delivered in the passage 116 as the planetary gear meshes with the ring gear 25. The fluid is also delivered through the passage 115 to the opposite side of the planetary gear where the ring gear 25 and the planetary gear 23 are unmeshing and is delivered to the passage 118 where the fluid is rotated about the outer periphery of the planetary gear 23. The fluid on this part of the planetary gear is delivered to the passage 119 as the planetary gear meshes with the sun gear 24. In this manner, the meshing and unmeshing of the planetary gear with the ring gear and the sun gear provides a pumping action of the cooling fluid and a positive pressure within the cooling fluid system.

In referring to FIGURE 10, it is readily seen that the fluid in passage 119 is forced through the outlet passage 119 to the outer periphery of the vehicle disk brake and the pressure chamber 70. The fluid in the pressure chamber 70 on the outer periphery of the brake disks is then transmitted to the inner periphery of the brake disks through the plurality of passage means 120. These passages are shown in FIGURE 11.

The fluid flows to the inner periphery of the brake disks in the chamber 121 and then is transferred laterally or axially through disk openings 150 and the plurality of axial passages 123. The axial passages 123 are in communication with the radial passage 124 and the outlet port 100. In this manner, the fluid from the inner periphery of the brake is transferred to the external portion of the brake through the passage means on the inner periphery of the oil delivery sleeve.

The operation of this system will be described in the following paragraphs. The vehicle brakes are actuated by depressing the foot pedal 86 which pressurizes fluid within the master cylinder 82. Pressurization of fluid within the master cylinder 82 in turn pressurizes fluid within the conduit 81 and the pressurizing chamber 36 of the hydraulic wheel cylinder 35. Pressurization within the actuating chamber 36 of the hydraulic wheel cylinder moves the hydraulic piston 37 axially thereby compressing the disk stack to frictionally engage the rotative and stationary disks to operate the vehicle brakes.

The brake disks are compressed against the inboard side of the pump housing 21 which in turn provides a reaction force against the reaction plate 11 through the cover plate 19. The ring gear 25 of the cooling fluid pump 20 is in rotation at all times when the vehicle wheel is rotated due to its spline connection with the inner brake housing 6. As the inboard side of the cooling pump housing 21 frictionally engages the stator disk 28 and the cover plate 19 frictionally engages the reaction plate 11, the pump housing is retarded in its rotation relative to the ring gear 25. This, in turn, creates a rotation of the planetary gears as they mesh the ring gear 25 and the sun gear 24. The sun gear 24 is rotatably mounted on the shaft housing 2 and as the gears rotate a pumping action is created by the cooling fluid pump 20. This creates a suction within the chamber 18 adjacent the inlet ports 113 of the cooling fluid pump. There is, however, at this point provided adequate supply of low pressure fluid to prevent a partial vacuum created at the inlet port of the cooling fluid pump. This fluid supply is provided by means of the return passages within the peripheral passage 16 on the inner periphery of the shaft housing 2. The passage 16 is filled with oil at all times by the return flow in the inlet passage 14 and also from the zero line passage 114. Although the overall volume of the system and the fluid itself changes slightly in its operation the creation of a vacuum within the fluid system adjacent the inlet port of the cooling fluid pump can decrease the efficiency of the operation in the cooling system. For this reason, it is necessary that the supply is supplemented through the zero line which is in communication with the peripheral passage 16 and the chamber 18 adjacent the inlet ports of the cooling fluid pump. It is also noted that on the zero line a check valve is provided adjacent each of the bearing assemblies 9 and 10 to provide a seal and to prevent suction of air through the seals 60 and 72.

As the cooling fluid pump 20 is in operation, the fluid pressure is created within the chamber 70. This pressure impinges upon the seal 69 and the seal 62 adjacent to the respective bearing assemblies 10 and 9. Although a slight leakage may be present at this point the pressure would never build up within the bearing chambers 9 and 10 as the check valves will provide a means for venting the pressurized fluid to the low pressure side of the fluid system.

The pressurized fluid in the chamber 70 passes radially inward to the chamber 121 through grooves 120 and is then transferred axially through the openings 150 and the plurality of passage 123 to the radial passage 124. The fluid leaves the brake housing through the passage 124 and flows through the heat exchanger 92 and returns through the inlet port 99.

As the vehicle brakes are released, the foot pedal 86 is released and the fluid within the master cylinder 82 is relieved. This, in turn, relieves the pressure within the actuating chamber 36 and permits a retraction of vehicle brakes. As the vehicle brakes are retracted, the frictional engagement of the stator disk 28 with the pump housing 21 is also released as well as frictional engagement of the reaction plate 11 with the cover plate 19. This, in turn, releases the pump housing and permits it to rotate again with the ring gear and the pumping unit 20 rotates as an assembly about the outer periphery of the shaft housing 2. This, in turn, stops pumping action of the cooling fluid pump 20.

While the embodiments of the invention as herein disclosed constitute preferred forms, it is to be understood that other forms might be adopted.

What is claimed is as follows:

1. In a vehicle brake having a cooling fluid system comprising in combination, a stationary member, at least one stationary disk connected to said stationary member, a rotating member, at least one rotating disk connected to said rotating member for frictionally engaging said stationary disk, fluid means for actuating the vehicle disk brake mounted on said stationary member adjacent the disk stack of said vehicle disk brake, a reaction plate mounted on said stationary member concentric with said vehicle brake disk for providing a reaction force when said brakes are actuated, a cooling fluid system including a cooling fluid pump mounted on said stationary member and disposed between said reaction plate on said disk stack of said vehicle disk brake, said cooling fluid pump having a ring gear rotating with said rotating member and a sun gear rotatably mounted on said stationary member, a plurality of planetary gears engaging said sun gear and said ring gear enclosed within a pump housing, said pump housing operating said cooling fluid pump through retardation by engagement with the adjacent stationary brake disk and said reaction plate, a cooling fluid system including passage means in communication with the outlet port of said cooling fluid pump, said passage means leading through said vehicle disk brake to an outlet port of said vehicle brake, an inlet port in said vehicle brake, passage means from said inlet port forming a plurality of passages in said stator member and forming a large chamber adjacent to the inlet side of said cooling fluid pump, external conduit means connecting said inlet port and said outlet port of said vehicle brake and having a heat exchanger, a reservoir, separate conduit means connecting said reservoir, a separate passage in said brake connecting said conduit means connecting said reservoir in communication with said plurality of passages in said stationary member to provide a large volume of low pressure fluid on the inlet side of said cooling fluid pump to prevent a vacuum drawn by said cooling fluid pump when said cooling is operated in response to actuation of said vehicle brakes.

2. In a vehicle brake comprising, a stationary member, at least one stationary brake disk connected to said stationary member, a rotating member, at least one rotating brake disk connected to said rotating member for frictionally engaging said stationary brake disk when said vehicle brakes are actuated, fluid means for actuating the vehicle brake, a reaction plate mounted on said stationary member concentric with said brake disks; a cooling fluid system comprising a cooling fluid pump concentrically mounted on said stationary member and disposed between said reaction plate and the adjacent stationary brake disk, fluid cooling passages connecting the outlet side of said cooling fluid pump for transferring fluid through said vehicle brake to an outlet port of said brake, inlet passage means connected to an inlet port of said brake to the inlet side of said cooling fluid pump, said inlet cooling fluid passage means including a passage longitudinally extending through said stationary member and passages connected thereto and provided in said stationary member and a chamber adjacent to the inlet side of said cooling fluid pump connected with said last named passages, external conduits connected to said inlet port and said outlet port of said brake and having a heat exchanger contained therein, a reservoir, separate conduit means connecting said reservoir to a zero line port, said zero line port in communication with said longitudinally extending passage in said stationary member to provide a large volume of low pressure fluid in said fluid chamber adjacent to the inlet port of said cooling fluid pump thereby preventing said cooling fluid pump from drawing a vacuum when said cooling fluid pump is initially operated in response to engagement of said vehicle brakes.

3. In a vehicle brake having a cooling fluid system comprising in combination, a stationary member, a stationary brake disk connected to said stationary member, a rotating member, a rotating brake disk connected to said rotating member for frictionally engaging said stationary brake disk when said vehicle brakes are actuated, hydraulic means for actuating the vehicle brakes, a reaction plate mounted on said stationary member concentric with said brake disks, a cooling fluid system including a cooling fluid pump concentrically mounted on said stationary member and having a housing containing a plurality of planetary gear means upon rotation of which in response to brake actuation said cooling fluid pump performs a pumping operation, said cooling fluid pump having a mating gear means rotating with said rotating member, internal cooling fluid passages in communication with the outlet port of said cooling fluid pump for conveying fluid through said vehicle brake to an outlet port of said brake, inlet passage means connected to an inlet port of said brake and forming a longitudinally extending passage means in said stator member and forming a chamber adjacent to the inlet port of said cooling fluid pump, external conduit means in communication with said inlet port and said outlet port of said brake and having a heat exchanger contained therein, a reservoir having an expansion chamber, conduit means connecting said reservoir to said longitudinally extending passage means in said stationary member to thereby provide an adequate supply of cooling fluid in said chamber adjacent to the inlet port of said cooling fluid motor to prevent drawing a vacuum when said cooling fluid motor initially operates in response to actuation of said vehicle brakes.

4. In a vehicle brake having a cooling fluid system comprising in combination, a stationary member, at least one stationary disk connected to said stationary member, a rotating member forming a brake housing, at least one rotating disk connected to said rotating member for frictionally engaging said stationary disk when the vehicle brakes are actuated, means for actuating said vehicle brakes, a reaction plate concentrically mounted in said stationary member concentric with said brake disks for providing a reaction force when said vehicle brakes are actuated, a cooling fluid system including a cooling pump concentrically mounted in said stationary member and disposed between one of said stationary disks and said reaction plate, said cooling fluid pump including a ring gear connected to and rotating with said rotating member, a sun gear on the inner periphery of said cooling fluid pump rotatably mounted on said stationary member, a pump housing enclosing a plurality of planetary gears for engagement with said ring gear and said sun gear and providing a means for operating said cooling fluid pump upon retardation of said housing means by frictional engagement with said one stationary brake disk and said reaction plate, passage means connecting the outlet port of said cooling fluid pump for transfer of fluid through said vehicle brake to an outlet port of said brake, an inlet port of said brake, passage means connecting said inlet port and forming a plurality of axially extending openings in said stationary member and forming a chamber adjacent to the inlet port of said cooling fluid motor, external conduit means connecting said inlet port and said outlet port of said brake containing a heat exchanger, an external reservoir, separate conduit means connecting said external reservoir with a second inlet port forming passage means in communication with said plurality of longitudinally extending openings in said stationary member, said chamber adjacent said inlet port of said cooling fluid motor thereby providing a large supply of low pressure cooling fluid adjacent the inlet port of said cooling fluid motor to prevent creation of a vacuum in this chamber when said cooling fluid motor is initially operated in response to actuation of said vehicle brakes.

5. In a vehicle brake having a cooling fluid system comprising in combination, a stationary member, at least one stationary brake disk connected to said stationary member, a plurality of bearing assemblies mounted on the outer periphery of said stationary member, a brake housing rotatably mounted on the outer periphery of said plurality of said bearing asesmblies, at least one rotating brake disk connected to said brake housing for frictionally engaging said stationary disk when said vehicle brakes are actuated, means for actuating the vehicle brake, a reaction plate mounted on said stationary member to provide a reaction force when said vehicle brakes are actuated, a cooling fluid system including a cooling fluid pump comprising a ring gear connected to said brake housing, a sun gear rotatably mounted on said stationary member, a plurality of planetary gears received within a housing, said housing for engaging the adjacent stationary brake disk and said reaction plate to provide retardation of the pump housing and a pumping action of said cooling fluid pump, the high pressure cooling fluid passage means connecting the outlet port of said cooling fluid pump to an outlet port of said vehicle brake, a low pressure cooling fluid passage means connecting an inlet port of said vehicle brake and an inlet port for said cooling fluid port, bearing chambers to receive said plurality of bearing assemblies, a seal means positioned between the high pressure cooling fluid passage means and said bearing chambers, a second seal means positioned between said low pressure passage mean and said bearing assemblies, said second seal means comprising a check valve to permit the fluid flow from said bearing chamber to the low pressure side of said cooling fluid system and preventing fluid from flowing from the low pressure side of said cooling fluid system into said bearing asesmbly thereby providing a means for preventing said cooling fluid pump from drawing a vacuum when said pump is in operation and also preventing said cooling fluid pump from drawing air through said bearing when said cooling fluid pump is in operation, external cooling fluid conduits in communication with the inlet port and the outlet port of said brake to provide a cooling fluid system for said vehicle brakes.

References Cited in the file of this patent

UNITED STATES PATENTS 2,828,840    Kelley et al.  ------------ Apr. 1, 1958

FOREIGN PATENTS 213,631    Australia  -------------- Mar. 13, 1958